(12) United States Patent
Wienand et al.

(10) Patent No.: US 8,183,974 B2
(45) Date of Patent: May 22, 2012

(54) 1200° C. FILM RESISTOR

(75) Inventors: Karlheinz Wienand, Aschaffenburg (DE); Thomas Loose, Linsengericht (DE); Margit Sander, Karlstein (DE)

(73) Assignee: Heraeus Sensor Technology GmbH, Hanau (DE)

( * ) Notice: Subject to any disclaimer, the term of this patent is extended or adjusted under 35 U.S.C. 154(b) by 723 days.

(21) Appl. No.: 12/237,742

(22) Filed: Sep. 25, 2008

(65) Prior Publication Data

US 2009/0115567 A1    May 7, 2009

(30) Foreign Application Priority Data

Sep. 28, 2007  (DE) .................... 10 2007 046 900

(51) Int. Cl.
*H01C 7/02*    (2006.01)

(52) U.S. Cl. ........................ 338/25; 338/22 R
(58) Field of Classification Search ............... 338/22 R, 338/25
See application file for complete search history.

(56) References Cited

U.S. PATENT DOCUMENTS

| | | |
|---|---|---|
| 2,045,640 A | 6/1936 | Fredericks |
| 2,818,482 A | 12/1957 | Bennett |
| 3,249,988 A | 5/1966 | Meyer |
| 3,749,631 A | 7/1973 | Hargett et al. |
| 3,952,276 A | 4/1976 | Walch et al. |
| 4,050,052 A | 9/1977 | Reichelt et al. |
| 4,378,489 A | 3/1983 | Chabinsky et al. |
| 4,445,109 A | 4/1984 | Naganoma et al. |
| 4,719,442 A | 1/1988 | Bohara et al. |
| 5,041,809 A * | 8/1991 | Payne et al. .............. 338/25 |
| 5,124,682 A | 6/1992 | Ishiguro |
| 5,202,665 A | 4/1993 | Hafele |
| 5,332,991 A | 7/1994 | Kojima et al. |
| 5,430,428 A * | 7/1995 | Gerblinger et al. ......... 338/25 |
| 5,448,068 A | 9/1995 | Lee et al. |
| 5,814,149 A | 9/1998 | Shintani et al. |

(Continued)

FOREIGN PATENT DOCUMENTS

DE     2327662 A1     1/1974

(Continued)

OTHER PUBLICATIONS

JP63055198 Derwent abstract only Mar. 1988.

(Continued)

*Primary Examiner* — Kyung Lee
(74) *Attorney, Agent, or Firm* — Panitch Schwarze Belisario & Nadel LLP

(57) ABSTRACT

For production of a high-temperature sensor, in which a platinum resistance film is applied on a metal-oxide substrate, in particular sapphire or a ceramic plate, and a ceramic intermediate layer is laid on the resistance film, a self-supporting cover, in particular a ceramic or glass-ceramic cover, is bonded on the ceramic intermediate layer or a glass ceramic is mounted on the intermediate layer over its entire surface. Advantageously, the glass ceramic is electrically conductive or an ion conductor above 750° C. and is laid on up to the cathode of the resistance film up to beyond the intermediate layer. In particular, the cover is bonded with a metal-doped glass ceramic, which is laid on the cathode of the resistance film up to beyond the intermediate layer. Preferably, the electrically insulating intermediate layer is coated with a glass ceramic or a glass ceramic doped with metal, which coating has a resistance of at most one megaohm per square at 850° C. or above.

16 Claims, 6 Drawing Sheets

U.S. PATENT DOCUMENTS

| | | | |
|---|---|---|---|
| 5,831,512 A * | 11/1998 | Wienand et al. | 338/25 |
| 5,857,890 A | 1/1999 | Ferran | |
| 6,118,166 A | 9/2000 | Shoji et al. | |
| 6,130,598 A | 10/2000 | Katsuki et al. | |
| 6,136,170 A | 10/2000 | Inoue et al. | |
| 6,164,819 A | 12/2000 | Moriwake et al. | |
| 6,229,121 B1 | 5/2001 | Jang et al. | |
| 6,341,892 B1 | 1/2002 | Schmermund | |
| 6,450,025 B1 | 9/2002 | Wado et al. | |
| 6,543,102 B1 | 4/2003 | Zitzmann | |
| 6,557,411 B1 | 5/2003 | Yamada et al. | |
| 6,617,956 B1 * | 9/2003 | Zitzmann | 338/25 |
| 6,653,926 B1 * | 11/2003 | Zitzmann | 338/25 |
| 6,698,922 B2 | 3/2004 | Adachi et al. | |
| 6,819,217 B2 | 11/2004 | Wienand et al. | |
| 7,046,116 B2 | 5/2006 | Damaschke et al. | |
| 7,106,167 B2 * | 9/2006 | Parsons | 338/25 |
| 2002/0015793 A1 | 2/2002 | Lee et al. | |
| 2002/0067243 A1 | 6/2002 | Noli | |
| 2002/0084885 A1 * | 7/2002 | Wienand et al. | 338/25 |
| 2002/0135454 A1 | 9/2002 | Ichida et al. | |

FOREIGN PATENT DOCUMENTS

| | | |
|---|---|---|
| DE | 2527739 A1 | 12/1976 |
| DE | 3205704 A1 | 9/1983 |
| DE | 4026061 C1 | 2/1992 |
| DE | 4104674 A1 | 8/1992 |
| DE | 4300084 A1 | 7/1994 |
| DE | 19540194 C1 | 2/1997 |
| DE | 19830821 A1 | 2/1999 |
| DE | 19750123 A1 | 6/1999 |
| DE | 19848524 C1 | 12/1999 |
| DE | 19901183 C2 | 1/2001 |
| DE | 10016415 A1 | 10/2001 |
| DE | 10104493 A1 | 8/2002 |
| DE | 10358282 A1 | 7/2005 |
| DE | 102004034185 B3 | 1/2006 |
| DE | 10 2007 038 680.1 | 2/2009 |
| EP | 0327535 B1 | 9/1991 |
| EP | 0471138 A2 | 2/1992 |
| EP | 0543413 A1 | 5/1993 |
| EP | 0973020 A1 | 1/2000 |
| EP | 1619485 A1 | 1/2006 |
| JP | 5756728 A | 4/1982 |
| JP | 57207835 A | 12/1982 |
| JP | 58165026 A | 9/1983 |
| JP | 60064401 A | 4/1985 |
| JP | 2164003 A | 6/1990 |
| JP | 323539 Y2 | 5/1991 |
| JP | 3165006 A | 7/1991 |
| JP | 2001230103 A | 8/2001 |
| RU | 2069324 C1 | 11/1996 |
| WO | 8705146 A1 | 8/1987 |
| WO | 92/15101 A1 | 9/1992 |
| WO | 00/04356 A1 | 1/2000 |
| WO | 0042402 A1 | 7/2000 |
| WO | 0042403 A1 | 7/2000 |

OTHER PUBLICATIONS

The Materials Science of Thin Films, Ohring, M. "Epitaxy", Chs. 7.1-7.2 (1992).

B.M. Lairson et al. Epitaxial Pt (001), Pt (110), and Pt (111) films on MgO (001), MgO(110), MgO(111) and Al2O3 (0001), Appl.Phys Lett. 61, American Institute of Physics, Sep. 21, 1992, pp. 1390-1392.

EP Search Report issued on Jun. 30, 2003 in EP Application No. EP 03 00 3376.

Office Action issued Nov. 5, 2002 in German Application No. 102 10 772.6-52 (with English translation of pertinent portions).

Office Action issued on May 26, 2005 in Japanese Application No. 2003-381455 (with some English translations).

Office Action issued Jul. 12, 2004 in U.S. Appl. No. 10/705,063.

Office Action issued Feb. 7, 2005 in U.S. Appl. No. 10/705,063.

Office Action issued Oct. 21, 2003 in U.S. Appl. No. 10/387,016.

Office Action issued Mar. 4, 2004 in U.S. Appl. No. 10/387,016.

Alex I.K. Lao et al., "Precise temperature control of microfluidic chamber for gas and liquid phase reactions", Sensors and Actuators, vol. 84, pp. 11-17, (2000).

John Pritchard, "Platinum Resistance Thermometers on Film", C&I, pp. 114, 116 & 119, (Jun. 1986).

Charles Kittel, "Einfuehrung in die Festkoerperphysik", Introduction to Solid State Physics, 4th Edition, R. Oldenbourg Verlag GmbH, pp. 43-46, (1976).

Office Action issued Sep. 15, 2005 in U.S. Appl. No. 10/705,063.

Office Action issued Jul. 23, 2004 in German Application No. 103 22 166.2-52 (with English translation of pertinent portions).

Communication dated Jan. 18, 2012 from German Patent Office forwarding Opposition against German Application No. 10 2007 046 900.6.

Opposition filed Oct. 21, 2011 against German Application No. 10 2007 046 9006.

Calendar view of the number of times http://www.corning.com/lightingmaterials/images/macor.pdf was crawled by the Wayback Machine (Internet Archive Wayback Machine), in 2005; dated Sep. 28, 2011; 1 page.

Corning, Discoving Beyond imagination; "Lighting and Materials" brochure; 8 pages.

Calendar view of the number of times http://www.schott.com/optics_devices/english/download/zerodur_catalog_2004.pdf was crawled by the Wayback Machine (Internet Archive Wayback Machine), in 2006; dated Sep. 26, 2011; 1 page.

Schott; "Zerodur Glass Cerammic"; Zerodur Catalog; 24 pages.

* cited by examiner

1200° C. FILM RESISTOR

BACKGROUND OF THE INVENTION

The present invention relates to an electrical temperature sensor with a resistance film pattern as a measurement resistor provided with electrical terminals on an electrically insulating surface of a substrate, in particular made of ceramic, wherein the resistance film pattern is covered with a diffusion blocking film.

From International Patent Application Publication No. WO 92/15101 a fast platinum metal temperature sensor is known, having a platinum resistance film applied on a ceramic substrate and a passivation layer is applied over this resistance film, wherein the passivation layer is formed as a double film made of a ceramic film and a glass film.

For production of such a temperature-dependent resistor as a temperature sensor, the resistance film (Pt meander) is applied as a thick film on a substrate having a surface made of electrically insulating material, wherein the outer surface of the resistance film is covered by a layer made of electrically insulating material, which is used as a passivation layer.

Furthermore, from European Patent Application Publication No. EP 0 543 413 A1 a method is known for producing a resistor, having temperature-dependent platinum as a temperature sensor, wherein an electrode is applied at a spacing to the resistance film. Here, if ion migration caused by current conduction to the resistance film is to be avoided, the electrode is connected in an electrically conductive manner to the resistance film.

From U.S. Pat. No. 5,202,665 a method is known for the production of a temperature sensor, wherein a platinum film is applied on a substrate using thick-film technology. Here, platinum powder is mixed with oxides and bonding agents and is applied using screen printing. Then, a heat treatment in the temperature range between 1300° C. and 1350° C. is performed. A temperature sensor produced in this way with a film having platinum on a substrate contains finely divided metallic platinum in an oxide ceramic and has a metallic platinum content in the range of 60 to 90 wt. %.

From European Patent EP 0 327 535 B1 a temperature sensor is known having a thin-film platinum resistor as a measurement element. A temperature measurement resistor made of platinum is formed on a surface of an electrically insulating substrate, wherein the resistor element is covered with a dielectric protective film, which is preferably made of silicon dioxide and which has a thickness in the range of 2000-4000 Ångstrom. Furthermore, as a cover layer, a diffusion blocking film is provided, which is applied by precipitation of titanium in an oxygen atmosphere for forming titanium oxide. This blocking film has a thickness in the range of 6,000 to 12,000 Ångstrom. Also, if the diffusion blocking film allows the oxygen to access the dielectric film and thus essentially prevents an attack of metal ions coming free from the glass film on the platinum film, this can still, nevertheless, under extreme environmental conditions lead to an attack on the platinum film, so that its physical behavior as a temperature measurement element is disrupted.

Furthermore, an electrical measurement resistor for a resistance thermometer as well as a method for producing such an electrical measurement resistor are known from U.S. Pat. No. 4,050,052 and the counterpart German Patent DE 25 27 739 C3.

According to European Patent Application Publication No. EP 0 973 020, such temperature sensors can be equipped with a sacrificial cathode and can withstand temperatures up to 1100° C. This technology protects the measurement resistor against chemical or mechanical attacks. For this sensor, however, it must always be taken care that the cathode is connected correctly electrically, because a mix-up of the electrical connections leads to destruction of the sensor. Incidentally, at temperatures above 700° C. the sensor is subject to drift.

BRIEF SUMMARY OF THE INVENTION

An object of the present invention lies in providing a sensor, whose drift in the application range of 750° C. to 1200° C. is reduced and which is preferably insensitive in terms of current connection.

According to the invention, for achieving the object, a cover is bonded onto the ceramic film covering the resistance film pattern. In particular, a glass ceramic or a ceramic cover containing glass ceramic is bonded on the ceramic film covering the resistance film. Preferably, the glass of the glass ceramic is high-purity quartz glass, or the glass ceramic film is bonded to the cathode of the resistance film beyond the ceramic intermediate layer.

The ceramic film covering the resistance film pattern is located on the side of the resistance film facing away from the substrate surface.

Preferably, the substrate is made of a metal oxide, in particular of sapphire or a ceramic.

In a particularly high value embodiment, a ceramic film, in particular a thin film made of $Al_2O_3$, is coated on a Pt resistor structure deposited epitaxially on sapphire, and on this film a quartz glass ceramic or a ceramic cover, in particular made of $Al_2O_3$ is bonded with quartz glass ceramic. In particular, the quartz glass ceramic is made of high-purity quartz glass and ceramic components.

In one particularly simple embodiment, a glass ceramic doped with metal or a glass ceramic is used, which above 750° C. is electrically conductive or is an ion conductor, wherein the glass ceramic, optionally doped with metal, is covering the ceramic film on the resistance film beyond the ceramic film connecting the cathode of the resistance film pattern. The glass ceramic provided with a cathode potential or grounded in this way prevents the migration of cations to the Pt measurement resistor. In particular, a wetting of the cathodically connected terminal field (pad) with glass ceramic results. Here, the glass ceramic, which is optionally doped with metal, contributes to stress relaxation of the terminal wire attached to the terminal pad.

In another embodiment, a cathode extending on or around the measurement resistor is connected with the glass ceramic on the ceramic film.

In this manner, according to the invention, a temperature-dependent cation scavenger (getter), which particularly becomes active only above 750° C., is arranged on the ceramic film covering the measurement resistor. Preferably, contact with the cathode is realized with a cathodically induced switch spot. The cation scavenger preferably contains zirconium oxide. The switch spot preferably contains an oxide, which reacts electrochemically at the potential of the cathode.

The present invention thus allows the control of the effectiveness of an ion scavenger by a temperature-dependent ion scavenger or a switch spot.

The switch spot can switch conventional ion scavengers, as well as the temperature-dependent ion scavengers according to the invention. Preferred ion scavengers become active only above 700° C., in particular above 750° C. According to the invention, ceramic or glassy ion scavengers are used. Zirconium oxide is a proven material.

As switch spots, materials that lead to electrochemical reactions at the cathode potential or the desired temperature conditions or the cathode potential and the desired temperature conditions are suitable.

Preferred are also oxides, in particular of glasses or ceramics.

In particular, in commercially available ceramic substrates, it is advantageous to also coat these substrates with the ion scavenger on the side facing away from the resistance film. Preferably, after the attachment of the terminal wires, the blank is immersed in a glass ceramic slip or enveloped with a glass ceramic paste. Preferably, ceramic substrates are surface treated according to DE 10 2007 038 680. In particular, the firing skin of the ceramic substrate is removed or the substrate surface is coated with pure ceramic material before the application of the resistance film.

A particularly economical production results with the application of a cover made of electrically insulating material with a glass ceramic adhesive, which is grounded. The cover provides a very efficient protection for preserving the functional properties of the sensor and promotes a long-term operating period of high quality.

The object is achieved according to the method, in that, on the side of the resistance film pattern facing away from the substrate surface, a glass ceramic film is bonded on the ceramic film covering the resistance film pattern at a spacing to the resistance film pattern. It has proven effective to form the glass ceramic as a cover or to bond a ceramic plate with the glass ceramic or to extend the glass ceramic up to the cathode. In particular, the glass ceramic is made of quartz glass and a ceramic component.

The object is also achieved according to the method, in that, on the diffusion blocking film covering the resistance film pattern, a glass ceramic doped with metal is formed as a cover or a ceramic plate is bonded with such a passivation layer or this passivation layer is extended up to the cathode. Especially high-quality glass ceramics contain quartz glass as a glass component and are doped with platinum.

In a preferred embodiment, the resistance film pattern is applied onto a ceramic mass—preferably aluminum oxide—and is then covered with a ceramic mass (likewise aluminum oxide) as a diffusion barrier or as a passivation layer. Here, the resistance film can be applied on a fired ceramic substrate, wherein the advantage results that the geometry of the structure of the resistance film remains unchanged. The diffusion barrier is preferably applied as an intermediate layer.

However, it is also possible to apply the resistance film on a so-called "green" ceramic as a carrier, wherein, after the application of the film made of electrically insulating material as a passivation layer or as a diffusion barrier, this is sintered together with the carrier. Thus, it is further possible for a multi-layer system to also apply a flamed up, "green" ceramic as a diffusion barrier or as a passivation layer, which is then bonded to the carrier and resistance film by a sintering process. Here, the use of an identical or similar material has proven itself as especially advantageous for the carrier and cover of the resistance film (passivation layer or diffusion barrier), because in this way a hermetically tight embedding of the resistance film or resistor structure is possible.

For forming the diffusion barrier or the passivation layer, ceramic powder can also be applied onto the resistance film by a thick-film method and then sintered. As an advantage, it results that this method is very economical.

Furthermore, it is possible to apply ceramic powder onto the resistance film pattern of a fired substrate in the plasma-spray method for formation of the diffusion barrier or the passivation layer. This has the advantage that, due to the high precipitation temperatures, the resulting film also maintains its stability at high temperatures occurring later during use.

In addition, the diffusion barrier or the passivation layer can be applied in a thin-film method by PVD (Physical Vapor Deposition), IAD (Ion Assisted Deposition), IBAD (Ion Beam Assisted Deposition), PIAD (Plasma Ion Assisted Deposition), or CVD (Chemical Vapor Deposition), or a magnetron sputtering method.

The object is achieved according to the device with a cover, which is fixed on the ceramic intermediate layer. An electrical temperature sensor having a resistance film pattern, which is arranged as a measurement resistor, provided with electrical terminals, on an electrically insulating surface of a carrier formed as a ceramic substrate, wherein the resistance film pattern is covered for protection against contamination or damage by at least one layer of electrically insulating material, which is formed as a passivation layer and/or as a diffusion barrier, is protected according to the invention with a cover, in order to withstand temperatures above 1000° C.

The measurement resistor is preferably a platinum-containing resistance film pattern, constructed particularly using thin-film or thick-film technology. The diffusion barrier is constructed in the form of an intermediate layer.

Advantageously, an economical production as well as a long service life of the temperature-dependent resistor have resulted.

In a practical embodiment, the thickness of the intermediate layer lies in the range of 0.2 μm to 50 μm.

In another embodiment, the cathode is provided with an electrical terminal. Here, it is possible to electrically bias the cathode negatively relative to both terminals of the resistance film or the measurement resistor. The glass ceramic on the intermediate layer, which is connected to the cathode, attracts positive ions (platinum poisons, such as metal ions) under extreme environmental conditions to the negative glass film.

In a preferred embodiment according to the invention, the carrier is made of $Al_2O_3$. Furthermore, the diffusion barrier or the intermediate layer is advantageously made of $Al_2O_3$, MgO, or a mixture of both materials, wherein the weight percentage of $Al_2O_3$ lies in the range of 20% to 70%.

Furthermore, it is possible to construct the diffusion barrier or intermediate layer from a layer system with a coating sequence of at least two layers, which are each formed from at least one oxide from the group $Al_2O_3$, MgO, $Ta_2O_5$; here, at least one layer can be formed of two of the mentioned oxides, wherein preferably a physical mixture of oxides is used; however, it is also possible to use mixed oxides.

In a further embodiment of the invention, the group of oxides including $Al_2O_3$, MgO, $Ta_2O_5$ can be expanded to include hafnium oxide.

Preferably, the diffusion barrier or the passivation layer is made of a one-layer system according to Table 1 with the materials specified in Examples 1 to 6 or from a multi-layer system according to Table 2, which has at least two layers 1 and 2, wherein, however, another layer or several layers can be attached to the layer 2. The different layer materials are designated in the individual examples or lines with numbers 7 to 30.

TABLE 1

| One-layer system | |
|---|---|
| 1 | only $Al_2O_3$ |
| 2 | only MgO |
| 3 | only $Ta_2O_5$ |
| 4 | mixture $Al_2O_3$/MgO |

TABLE 1-continued

One-layer system

| | |
|---|---|
| 5 | mixture Al$_2$O$_3$/Ta$_2$O$_5$ |
| 6 | mixture MgO/Ta$_2$O$_5$ |

TABLE 2

Multi-layer system

| | Layer 1 | Layer 2 |
|---|---|---|
| 7 | only Al$_2$O$_3$ | only Al$_2$O$_3$ |
| 8 | only Al$_2$O$_3$ | only MgO |
| 9 | only MgO | only MgO |
| 10 | only Ta$_2$O$_5$ | only Ta$_2$O$_5$ |
| 11 | only Ta$_2$O$_5$ | only Al$_2$O$_3$ |
| 12 | only Ta$_2$O$_5$ | only MgO |
| 13 | mixture Al$_2$O$_3$/MgO | only Al$_2$O$_3$ |
| 14 | only Al$_2$O$_3$ | mixture Al$_2$O$_3$/MgO |
| 15 | mixture Al$_2$O$_3$/MgO | mixture Al$_2$O$_3$/MgO |
| 16 | mixture Ta$_2$O$_5$/MgO | only Al$_2$O$_3$ |
| 17 | only Ta$_2$O$_5$ | mixture Al$_2$O$_3$/MgO |
| 18 | mixture Ta$_2$O$_5$/MgO | mixture Al$_2$O$_3$/MgO |
| 19 | mixture Al$_2$O$_3$/Ta$_2$O$_5$ | only Al$_2$O$_3$ |
| 20 | only Al$_2$O$_3$ | mixture Ta$_2$O$_5$/MgO |
| 21 | mixture Al$_2$O$_3$/MgO | only Ta$_2$O$_5$ |
| 22 | only Ta$_2$O$_5$ | mixture Al$_2$O$_3$/Ta$_2$O$_5$ |
| 23 | only Al$_2$O$_3$ | mixture Al$_2$O$_3$/Ta$_2$O$_5$ |
| 24 | mixture Al$_2$O$_3$/MgO | mixture Ta$_2$O$_5$/MgO |
| 25 | mixture Ta$_2$O$_5$/MgO | mixture Ta$_2$O$_5$/MgO |
| 26 | mixture Al$_2$O$_3$/Ta$_2$O$_5$ | only Ta$_2$O$_5$ |
| 27 | only MgO | mixture Al$_2$O$_3$/MgO |
| 28 | only MgO | mixture Al$_2$O$_3$/Ta$_2$O$_5$ |
| 29 | mixture Al$_2$O$_3$/MgO | only MgO |
| 30 | mixture Al$_2$O$_3$/Ta$_2$O$_5$ | only MgO |

The use of these materials has proven to be particularly advantageous, because these metal oxides are also still stable at high temperatures. The intermediate layer or passivation layer is preferably produced by PVD, IAD, IBAD, PAD, or a magnetron-sputtering method.

Furthermore, according to both embodiments, the passivation layer has a mixture made of SiO$_2$, BaO, and Al$_2$O$_3$, wherein the weight percentage of SiO$_2$ lies in the range of 20% to 50%.

It has proven advantageous here that this mixture has an insulation resistance.

The new electrical high temperature sensor is applicable above temperatures of 1000° C. up to 1200° C.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
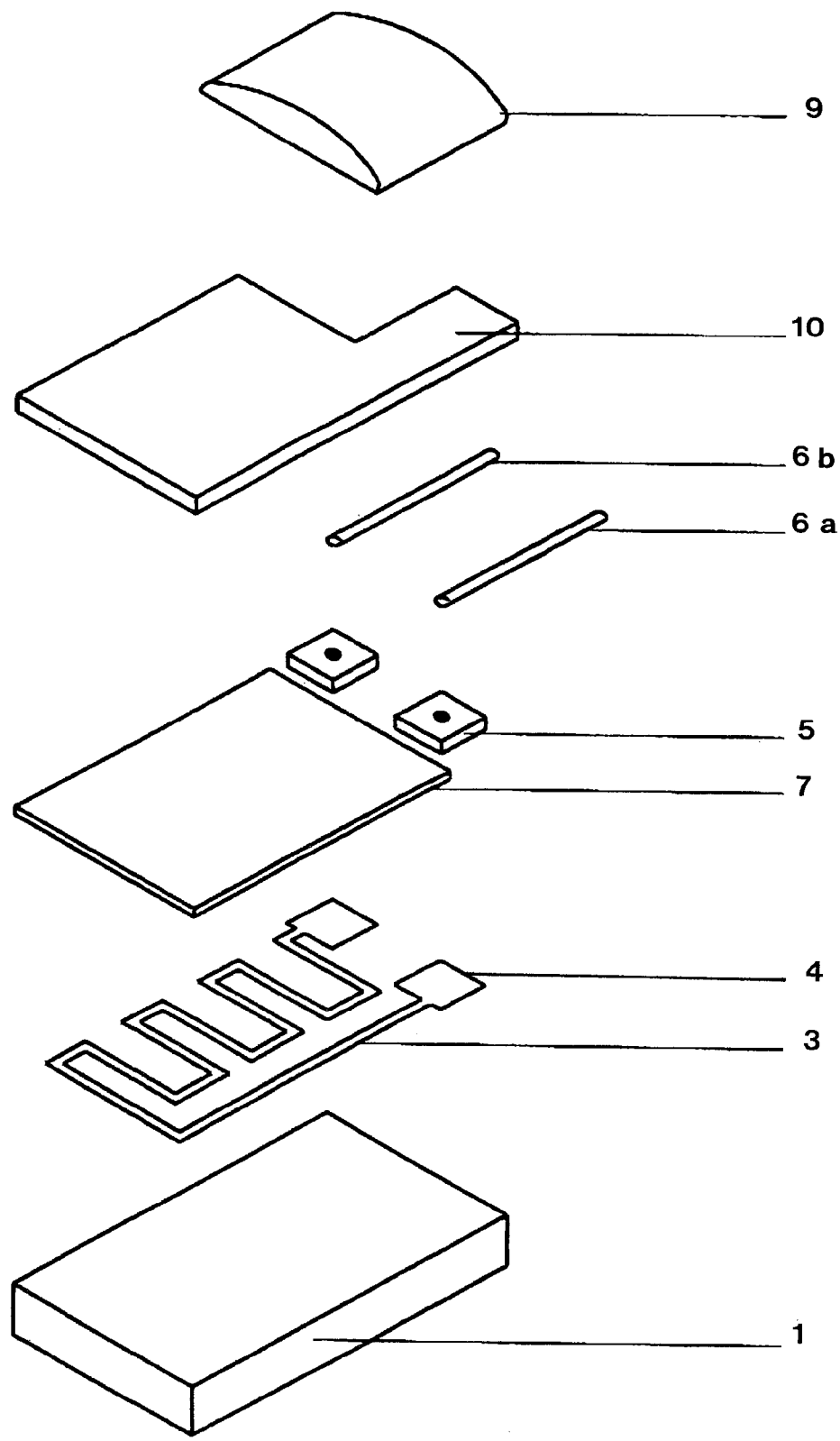
FIG. 1 is a perspective, exploded view of a measurement resistor of an embodiment according to the invention, having terminal surfaces on a sapphire, wherein the resistor is constructed as a meander structure and is covered by a diffusion blocking film and a passivation layer.

According to FIG. 1, the resistance film 3 serving as a measurement resistor is located as a thin film on a planar surface of a sapphire 1. The resistance film 3 is constructed in the form of a meander with contact pads 4, as known, for example, from German Patent DE 40 26 061 C1 or European Patent EP 0 471 138 B1. The contact pads 4 are made of the same material as the resistance film 3. The resistance film 3 is provided on its side facing away from the substrate 1 with a diffusion blocking film 7 as the intermediate layer 7, which is covered, for its part, with a passivation layer 10 made of quartz glass ceramic.

Due to this passivation layer 10, the sensitive structure of the platinum-containing resistance film 3 is effectively protected against atmospheric poisons of the environment. In such a multi-layer structure, for high purity of the ceramic and quartz glass components of the quartz glass ceramic 10, cations that are very harmful for the platinum resistance film 3 are avoided, which would contaminate platinum very quickly at high temperatures by migration in the electric field and thus would drastically influence the temperature/resistance function of the resulting platinum alloy, so that the high-temperature resistance of the resistance film 3 for temperature measurements would no longer be given. Due to the first thermodynamically stable and pure aluminum oxide film as an intermediate layer or diffusion barrier 7, the entry of silicon and other substances and ions poisoning the platinum is prevented. Thus, the meander-shaped, for example, structured resistance film is protected from poisoning. The application of the intermediate layer or diffusion barrier 7 can be achieved by physical vapor deposition.

The aluminum oxide film 7 is thus deposited over-stoichiometrically in a manner such that a very stable film of pure aluminum oxide (Al$_2$O$_3$) covers the platinum structure of the resistance film 3. The silicon-containing passivation layer 10 made of glass ceramic thus results in absolutely no contact with the active platinum resistance film 3, and a sealing of the resistance film 3 as a mechanical protection against external contaminating elements is thus guaranteed.

Figure 2:
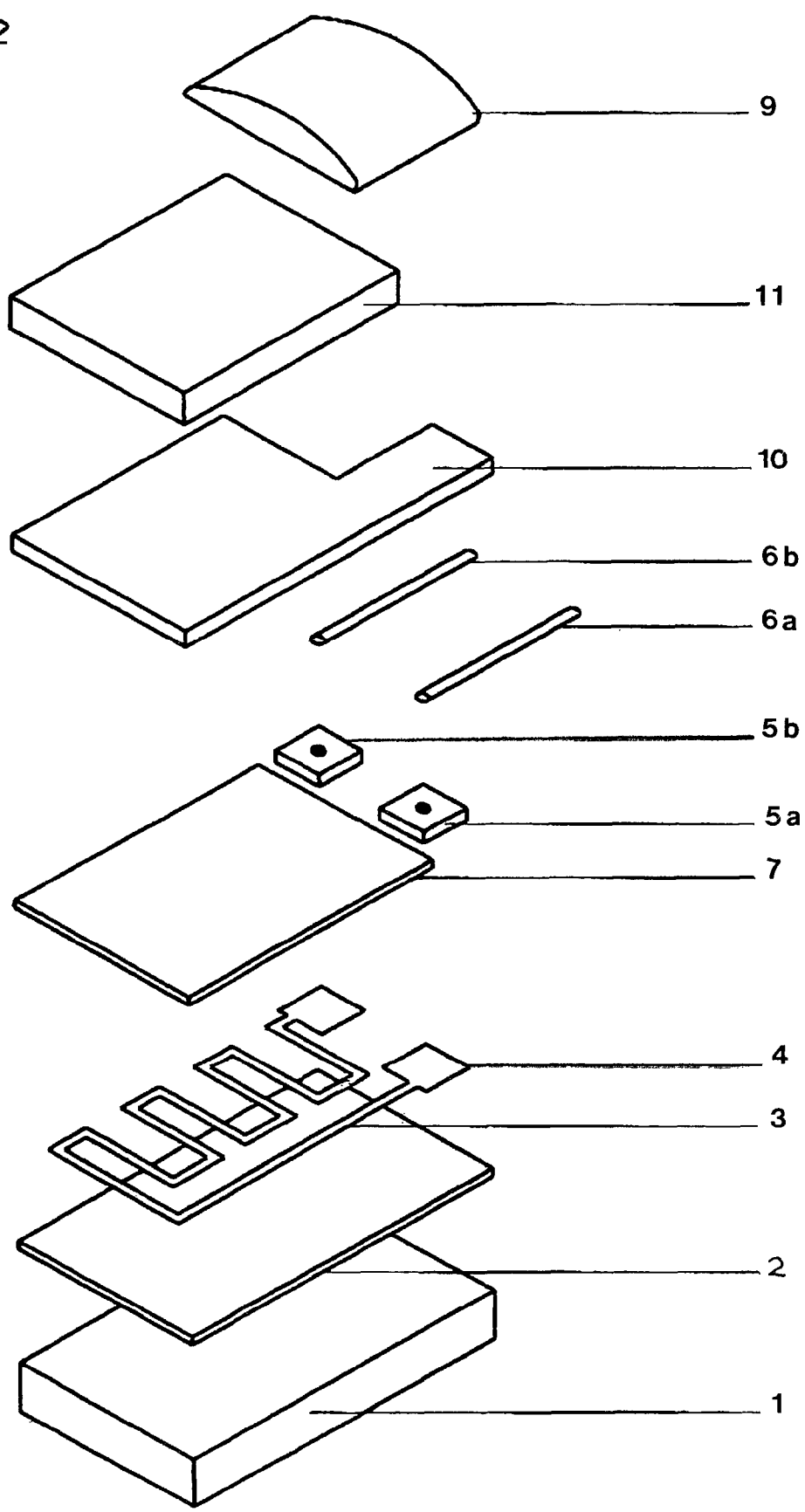
FIGS. 2 and 3 are perspective, exploded views similar to FIG. 1, showing embodiments of the invention, wherein an additional passivation layer is bonded in the form of a ceramic plate.
Figure 3:
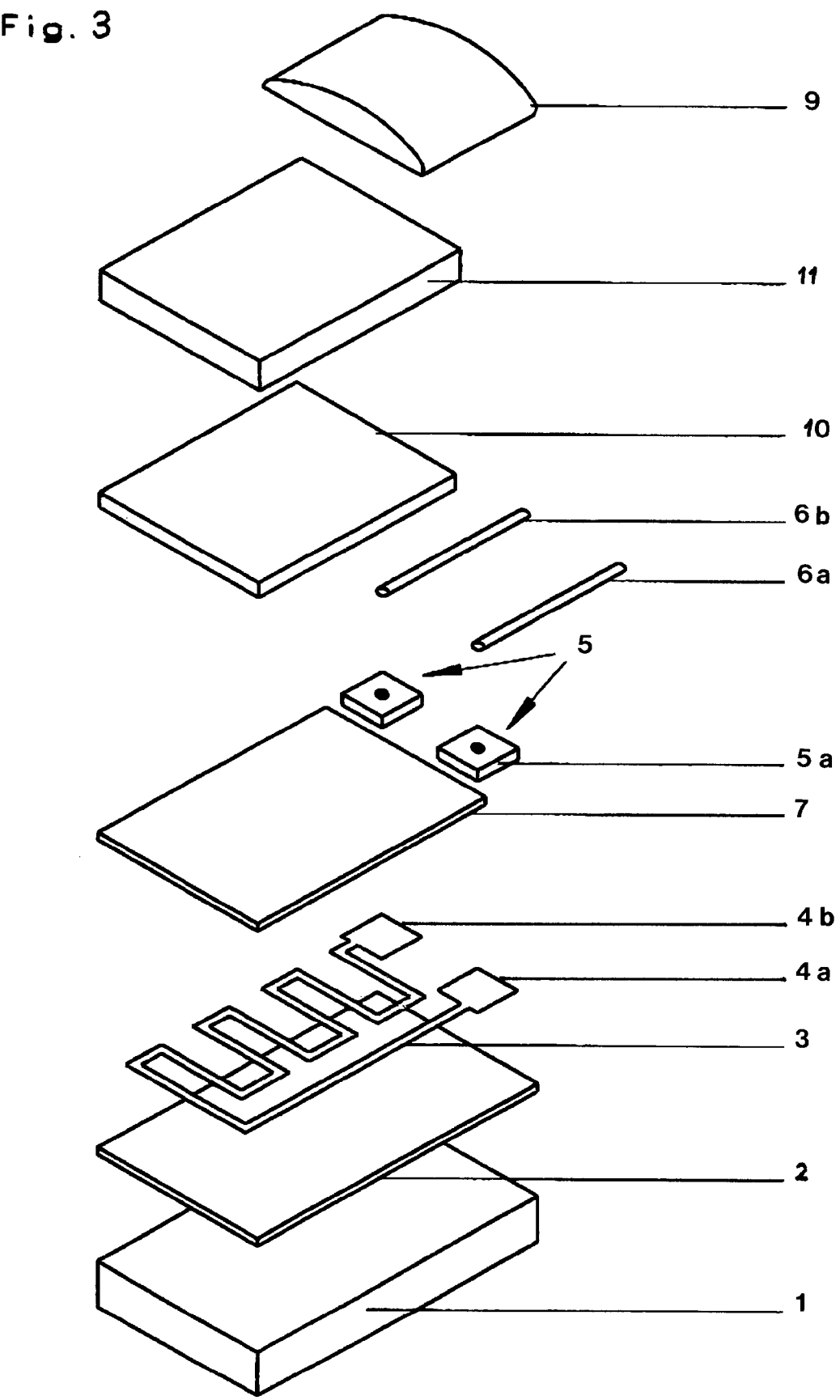

According to FIGS. 2 and 3, a ceramic plate 11 is bonded onto the glass ceramic 10 doped with metal, in particular platinum. The ceramic plate 11 represents additional passivation and acts as a mechanical "protective shield" against abrasion by particles, as those occurring, e.g., with use as a temperature sensor directly in the exhaust-gas flow of internal combustion engines. The main function is the improvement of the corrosion resistance. Furthermore, the substrate 1 is constructed as a substrate removed from its firing skin and is coated with a thin film 2 made of aluminum oxide.

In an embodiment according to FIG. 2, the terminal pad 5a provided with a terminal wire 6a is the cathode and the thin film 7 made of aluminum oxide and arranged on the measurement resistor 3 is covered with a glass ceramic 10 doped with metal.

The negative potential of this cathodically grounded passivation layer 10 prevents cation migration to the Pt resistance film.

In an embodiment according to FIG. 3, the terminal pads 5a and 5b provided with terminal wires 6a and 6b are relieved of stress with an electrically insulating fixing bead 9. The glass ceramic is made of high purity components of quartz glass and $Al_2O_3$. This passivation layer has only cations, which are fixed in the ceramic, whereby no migration of cations in the electric field occurs.

Figure 4:
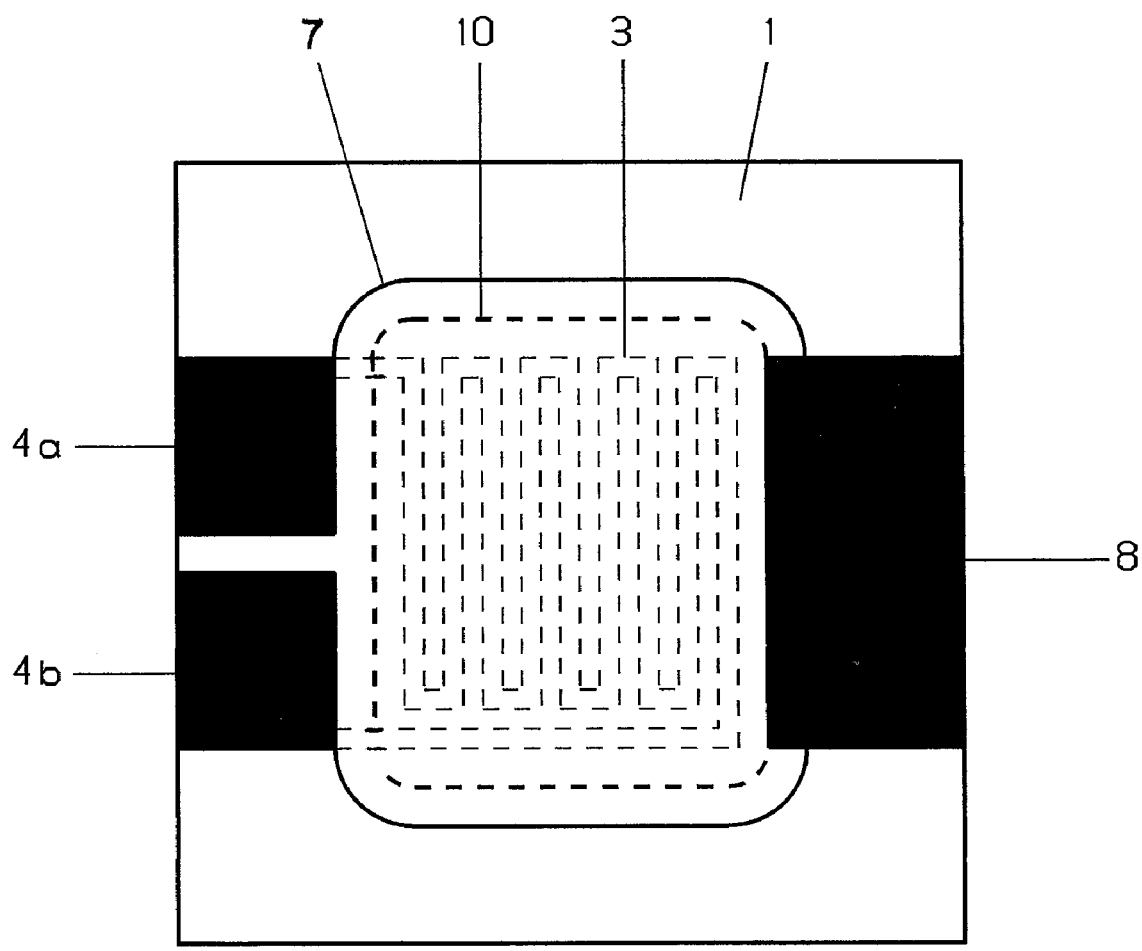
FIG. 4 is a schematic plan view of an embodiment according to FIG. 5 with the two free contact surfaces and the contact for the electrodes.
Figure 5:
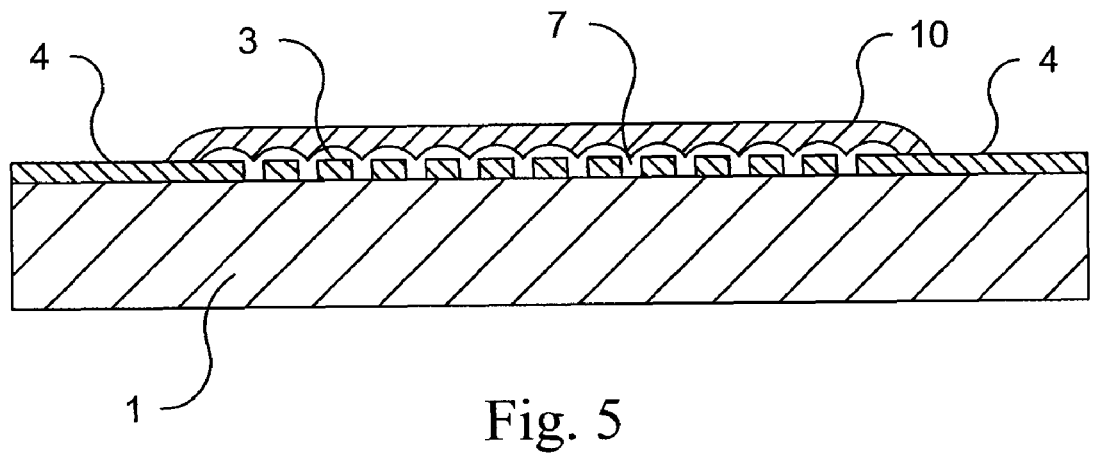
FIG. 5 is a side cross sectional view showing a measurement resistor according to an embodiment of the invention, having terminal surfaces on a ceramic substrate, wherein the resistor is constructed as a meander structure and is covered by a diffusion blocking film and a passivation layer.

According to FIGS. 4 and 5, there is a resistance film 3 made of platinum acting as a measurement resistor on a flat surface of a substrate or carrier 1 made of sapphire or aluminum oxide ceramic ($Al_2O_3$). It is preferably structured in the form of a meander with terminal contact pads 4a, 4b, as known, for example, from the already mentioned DE 40 26 061 C1. The resistance film 3 is surrounded on the side facing away from the substrate 1 by a diffusion barrier 7 as an intermediate layer, wherein this is covered in turn by an outer cover layer as passivation layer 10 made of glass ceramic doped with metal. The passivation layer 10 is laid on the platinum cathode 8 next to the resistance film 3 beyond the intermediate layer, in order to keep cations possibly coming out of the passivation layer 10 away from the resistance film 3 made of platinum, in that it absorbs the cations. It is thus possible to provide protection against the migration of cations in the electric field even for aggressive high-temperature environments. For this reason, it is also advantageous to remove the firing skin of a ceramic substrate and to coat the ceramic substrate 1 with an $Al_2O_3$ thin film 2, in order to arrange the resistor structure 3 on this thin film. In this manner, the high-temperature resistance of the resistance film 1 made of platinum and thus the entire temperature sensor is maintained for a long measurement period.

FIG. 4 shows the top view of FIG. 5 with the two terminal pads 4a, 4b for the resistor and a separate cathode 8 for the glass ceramic 10, which is illustrated here for the purpose of better clarity along its periphery by thick, dashed lines. In this embodiment, it is possible to bias the glass ceramic "electrically negatively" relative to the resistor. The cations poisoning the resistor are drawn to the glass ceramic 10 connected to the cathode 8 and doped with metal. Poisoning is thus prevented. Sufficient protection is achieved when the glass ceramic 10 doped with metal is grounded on the electrically negative terminal of the resistor. The diffusion barrier 7 is here shown along its periphery by a solid line. In a simple, not-shown construction, the glass ceramic 10 doped with metal is grounded by a conductor track from the cathode 8 to the terminal pad 4a.

Also, according to FIG. 4, if an approximately quadratic resistor geometry is shown, the format of resistors according to the invention lies in the range of 1 to 6 mm for the width and in the range of 3 to 50 mm for the length.

Figure 6:
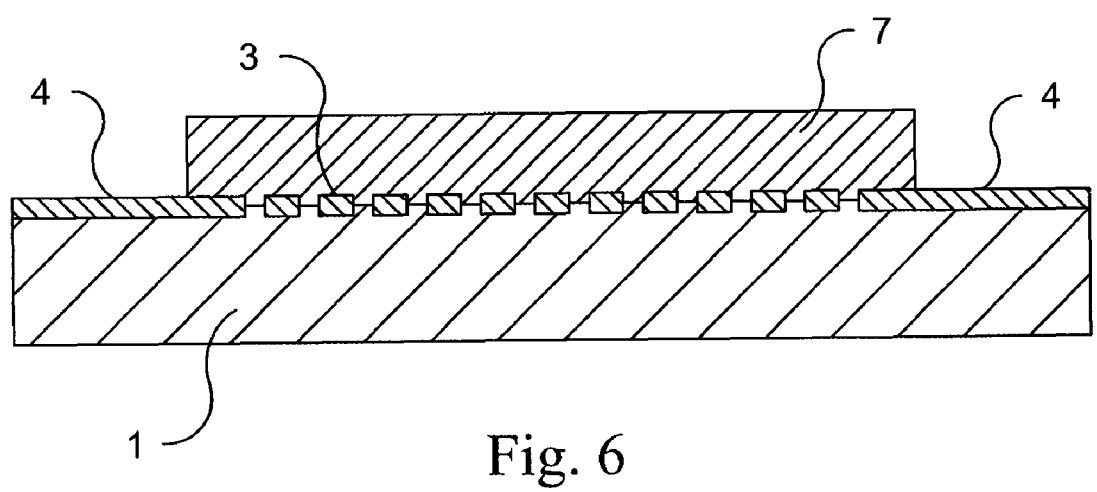
FIG. 6 is a side cross sectional view showing a measurement resistor according to an embodiment of the invention, having terminal surfaces, whose meander-shaped resistance structure is hermetically embedded between the carrier and cover, wherein its construction is produced by the sintering together of green ceramic.

According to FIG. 6, a resistor with terminal contact surfaces 4a, 4b is applied onto a carrier 1 as a substrate made of green ceramic and the structured resistance film 3 is covered with a passivation likewise of green ceramic in the form of a plate 7. By a common firing process, the carrier 1 and cover 7 are sintered together and hermetically embed the resistance film 3 or structure. After the sintering process, the carrier 1 and plate 7 form, as a cover, a very resistant mechanical and chemical passivation for the resistor 3 with the properties of "fired ceramic." On the exposed terminal surfaces 4, 5, terminals in the form of wires 6, bands, or clamps can be welded or soldered or bonded, which can then be sealed with a glass ceramic.

Figure 7:
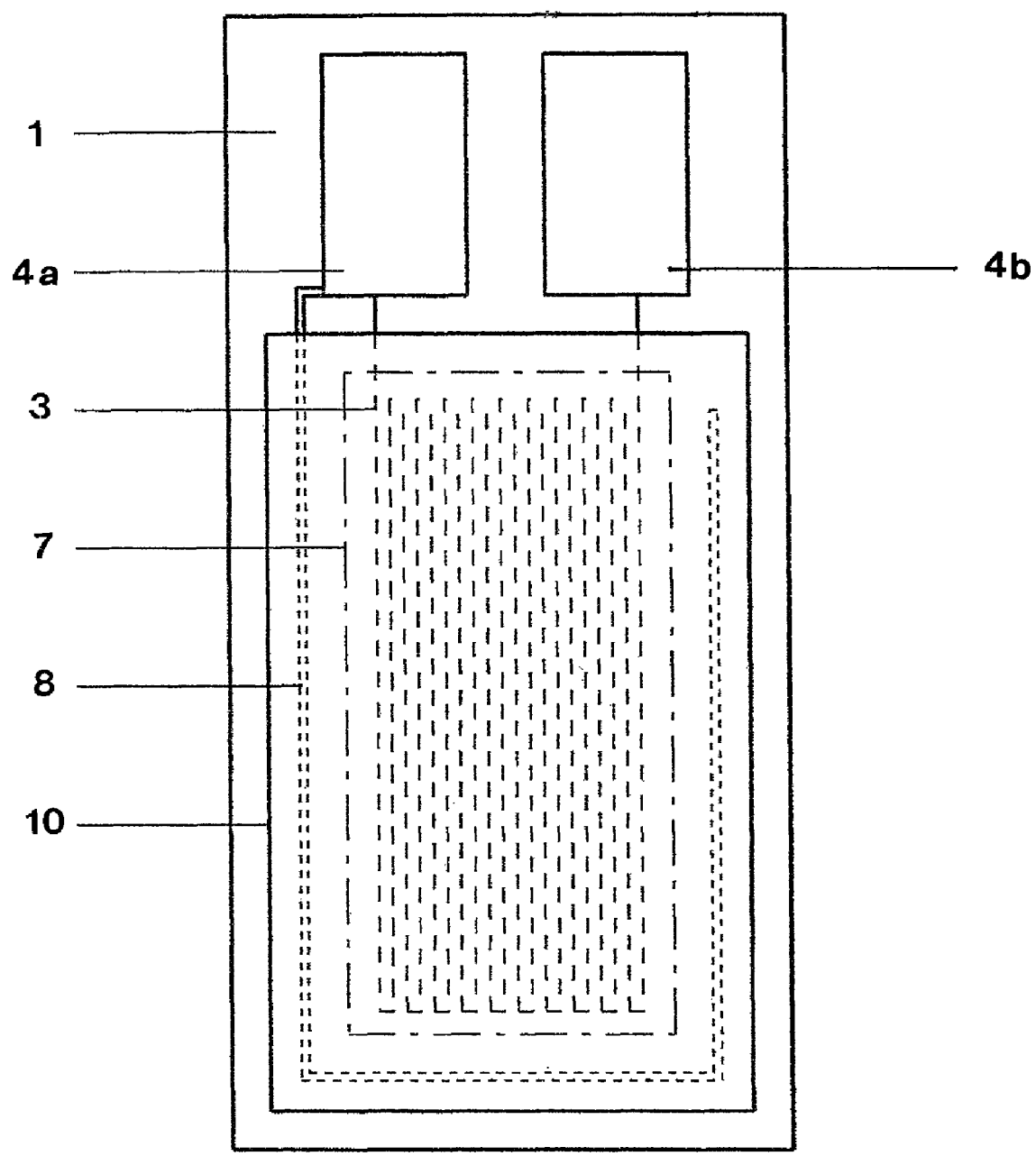
FIG. 7 is a schematic plan view showing a chip according to an embodiment of the invention, in which a cathode is arranged around a measurement resistor on a substrate.

In FIG. 7, on a substrate 1, the cathode 8 surrounds the resistor structure 3, which is formed as a meander. The cathode 8 is here connected via the pad 4a, to which the resistor structure is connected cathodically. Alternatively, the cathode can be connected to a separate cathode potential. The cathode 8 can also be constructed, alternatively, as part of the resistor structure, in that the cathode terminal of the resistor structure 3 is constructed as a cathode 8, which substantially surrounds the resistor structure 3. The resistor structure 3 is covered by a passivation layer 7, but not the part of the resistance film used as cathode 8 or the separate cathode 8. A glass ceramic 10 arranged on the diffusion barrier film 7 is laid on above the diffusion barrier film 7 up to the cathode 8.

The thickness of the resistance film 3 lies in a range of 0.5 to 5 µm, advantageously at 1.5 µm; the thickness of the passivation layer 10 lies in a range of 5 to 50 µm, preferably at 25 µm.

The thickness of a cathode 8 deposited in a thin-film method lies in the range of 0.2 to 10 µm, preferably at 5 µm; the thickness of a cathode 8 deposited in a thick-film method lies in the range of 5 to 30 µm, preferably at 15 µm.

As a supplement to the embodiment mentioned above of the intermediate layer as a diffusion barrier 7, it should be noted that this is either deposited in a thin-film method with a thickness in the range of 0.2 to 10 µm, preferably 5 µm, or in a thick-film method with a thickness in the range of 5 to 50 µm, preferably 15 µm.

The thickness of the connection contact surface pads 5 at the resistor 3 lies in the range of 20 to 100 µm, preferably at 50 µm; these values also apply for the thickness of the cathode 8. As the substrate, the carrier 1 has a thickness in the range of 0.13 mm to 1 mm, preferably at 0.635 mm.

The terminal surfaces 4 shown in most Figures are each arranged on one side. However, it is also possible to use embodiments of a temperature-dependent resistor according to the invention, in which the two terminal pads according to FIGS. 5 and 6 are arranged respectively on opposing sides.

The production of a temperature sensor according to FIG. 2 is realized with the following process steps:

1. Removal of firing skin of the ceramic substrate by sputter etching;
2. Deposition of an $Al_2O_3$ thin film 2;
3. Deposition of a platinum thin film 3 on the $Al_2O_3$ thin film 2 on a carrier 2 formed as a ceramic substrate 1;
4. Photolithographic structuring of the Pt thin film 3;
5. Covering of the pads 4;
6. Vapor deposition of an $Al_2O_3$ thin film 7 or deposition of the diffusion barrier 7 as $Al_2O_3$ blocking film by using magnetron sputtering or plasma spraying. A coating of the terminal contact surfaces 4 is prevented by the use of shadow masks;
7. Deposition of thick-film paste on the terminal contact pads 4 and attachment of the terminal wires 6 on the pads 5;
8. Deposition of glass ceramic 10 by use of glass ceramic paste or glass ceramic adhesive;
9. Placement of a ceramic cover 11;
10. Deposition of a stress-relieving bead 9 in the region of the terminal pads 5;
11. Partitioning of the usable substrate area or multiple substrates into individual resistor sensors by sawing.

According to FIG. 3, in contrast to FIG. 2, the application of the glass ceramic 10 and the ceramic cover 11 and then the application of the thick-film pads 5 and terminal wires 6 connected to these pads and a fixing 9 for stress release of the terminal wires are performed after the application of the Al$_2$O$_3$ thin film 7.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing a high-temperature sensor, comprising the steps of depositing a platinum-resistance film pattern on a metal-oxide substrate, laying a ceramic intermediate layer directly on the resistance film pattern, and bonding a self-supporting cover onto the ceramic intermediate layer or mounting a glass ceramic on the intermediate layer over its entire surface.

2. The method according to claim 1, wherein the self-supporting cover comprises a glass ceramic and is bonded onto the ceramic intermediate layer over its entire surface.

3. The method according to claim 2, wherein the self-supporting ceramic cover is bonded with quartz-glass ceramic onto the ceramic intermediate layer.

4. The method according to claim 1, wherein the glass ceramic is laid on a cathode of the resistance film pattern up to beyond the intermediate layer.

5. The method according to claim 4, wherein above 750° C. the glass ceramic is electrically conductive or an ion conductor.

6. The method according to claim 1, wherein the cover is bonded with a metal-doped glass ceramic, which is laid on a cathode of the resistance film pattern up to beyond the intermediate layer.

7. A method for producing a high-temperature sensor, comprising the steps of depositing a platinum resistance film pattern on a metal-oxide substrate, laying a ceramic intermediate layer directly on the resistance film pattern, and bonding a quartz-glass ceramic as a cover on the ceramic intermediate layer.

8. The method according to claim 1, wherein contact fields for the resistance film are not covered by the intermediate layer, and terminal wires are connected to the contact fields between the steps of laying the ceramic intermediate layer and bonding the cover.

9. A high-temperature sensor chip comprising contact pads and a platinum resistance film pattern connected to the pads on a metal-oxide substrate, a ceramic intermediate layer disposed directly on the resistance film pattern, and a glass ceramic or a cover comprising oxide material optionally doped with metal, the cover being mounted on the ceramic intermediate layer over its entire surface.

10. The high-temperature sensor chip according to claim 9, wherein the cover comprises a glass ceramic optionally doped with metal and a ceramic plate.

11. The high-temperature sensor chip according to claim 10, wherein the glass ceramic comprises a quartz-glass ceramic or extends up to a cathode beyond the intermediate layer.

12. The high-temperature sensor chip according to claim 10, wherein the high-temperature sensor chip is a wired film resistor.

13. The high-temperature sensor chip according to claim 12, wherein the contact pads for the resistance film are each connected to a terminal wire and the pads are not covered by the intermediate layer.

14. The high-temperature sensor chip according to claim 9, comprising a metal oxide substrate having an electrically insulating surface and a platinum measurement resistor arranged on the surface and having electrical terminals and a ceramic film covering the platinum measurement resistor but not the electrical terminals, wherein the electrically insulating intermediate layer is coated with a glass ceramic optionally doped with metal, and the coating has a resistance of at most one megaohm per square at 850° C. or above.

15. The high-temperature sensor chip according to claim 14, wherein the ceramic film comprises Al$_2$O$_3$ or MgO or Ta$_2$O$_5$.

16. The high-temperature sensor according to claim 9, wherein the glass ceramic optionally doped with metal, which bonds the ceramic cover to the ceramic intermediate layer, is connected to a cathode and has cathode potential.

* * * * *